United States Patent
Ahmad et al.

(10) Patent No.: US 10,992,583 B1
(45) Date of Patent: Apr. 27, 2021

(54) OPPORTUNISTIC PACKET RETRANSMISSIONS

(71) Applicant: FORD GLOBAL TECHNOLOGIES, LLC, Dearborn, MI (US)

(72) Inventors: Syed Amaar Ahmad, Canton, MI (US); Ivan Vukovic, Birmingham, MI (US); Jayanthi Rao, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

(21) Appl. No.: 16/594,961

(22) Filed: Oct. 7, 2019

(51) Int. Cl.
*H04L 12/801* (2013.01)
*H04L 12/911* (2013.01)
*H04L 1/18* (2006.01)

(52) U.S. Cl.
CPC .......... *H04L 47/127* (2013.01); *H04L 1/1896* (2013.01); *H04L 47/741* (2013.01); *H04L 47/823* (2013.01)

(58) Field of Classification Search
CPC ... H04L 47/127; H04L 1/1896; H04L 47/741; H04L 47/823
See application file for complete search history.

(56) References Cited

U.S. PATENT DOCUMENTS

| | | | |
|---|---|---|---|
| 6,882,624 B1 | 4/2005 | Ma | |
| 7,385,923 B2 | 6/2008 | Baratakke et al. | |
| 8,396,072 B2 | 3/2013 | Jokinen et al. | |
| 8,477,802 B2 | 7/2013 | Inukai et al. | |
| 8,549,170 B2 | 10/2013 | Minami et al. | |
| 9,408,109 B2 | 8/2016 | Jonsson et al. | |
| 9,942,918 B2 * | 4/2018 | Rapaport | H04L 1/1825 |
| 2007/0070902 A1 * | 3/2007 | Elaoud | H04L 47/823 370/231 |
| 2009/0225682 A1 * | 9/2009 | Grote-Lopez | H04L 41/083 370/255 |
| 2016/0057770 A1 * | 2/2016 | Yerramalli | H04W 74/08 370/329 |

(Continued)

FOREIGN PATENT DOCUMENTS

WO 2011064810 A1 6/2011

*Primary Examiner* — Jael M Ulysse
(74) *Attorney, Agent, or Firm* — Michael J. Spenner; Brooks Kushman P.C.

(57) ABSTRACT

In an opportunistic packet retransmission strategy, responsive to determining that a retransmission mode is set, a retransmission probability is calculated using minimum and maximum channel busy level retransmission thresholds, such that if a channel busy level of a communication channel is less than a minimum channel busy level retransmission threshold then a retransmission probability is set to 100%, if the channel busy level is greater than the maximum channel busy level then the retransmission probability is set to 0%, and within the minimum and maximum channel busy level retransmission thresholds the retransmission probability is set to decrease from 100% to 0% as a channel busy level of the communication channel rises from the minimum channel busy level retransmission threshold to the maximum channel busy level retransmission threshold. The message is retransmitted responsive to randomly determining whether to retransmit according to the retransmission probability.

20 Claims, 4 Drawing Sheets

(56) References Cited

U.S. PATENT DOCUMENTS

2017/0048880 A1\* 2/2017 Anderson ......... H04W 72/1268
2017/0303159 A1\* 10/2017 Ma .................... H04W 28/0289
2018/0048572 A1\* 2/2018 Gulati .................... H04L 47/24

\* cited by examiner

OPPORTUNISTIC PACKET RETRANSMISSIONS

TECHNICAL FIELD

Aspects of the disclosure generally relate to opportunistic packet retransmissions.

BACKGROUND

In data communications, whether wireless or cabled, a communication channel inevitably introduces corruption and errors into the received packets, such that a recipient network node may not correctly receive the original message transmitted by the source network node. Retransmission of an original message is a technique that may help improve communication reliability. However, retransmission also increases the congestion on the channel and therefore reduces the transmission opportunity for other sender network nodes.

SUMMARY

In one or more illustrative examples, a system for opportunistic packet retransmission comprises a network node, including a processor and a network transceiver configured to perform network communication over a communication channel. The processor programmed to transmit a message over the communication channel, verify that a count of transmissions of the message is within a maximum retransmission limit for the message, determine a channel busy level for the communication channel, responsive to determining that a retransmission mode is set, calculate a retransmission probability using minimum and maximum channel busy level retransmission thresholds, such that if the channel busy level is less than the minimum channel busy level retransmission threshold then the probability of retransmission is set to 100%, if the channel busy level is greater than the maximum channel busy level then the probability of retransmission is set to 0%, and within the minimum and maximum channel busy level retransmission thresholds the probability of retransmission is set to decrease from 100% to 0% as the channel busy level rises from the minimum channel busy level retransmission threshold to the maximum channel busy level retransmission threshold, update the retransmission mode by randomly determining whether to retransmit according to the retransmission probability, and if the retransmission mode indicates to continue with retransmission, perform retransmission of the message over the communication channel and update the count of transmissions of the message.

In one or more illustrative examples, a method for opportunistic packet retransmission by a network node includes verifying that a count of transmissions of a message over a communication channel is within a maximum retransmission limit for the message; when verified, and responsive to determining that a retransmission mode is set, calculating a retransmission probability using minimum and maximum channel busy level retransmission thresholds, such that if the channel busy level is less than the minimum channel busy level retransmission threshold then the retransmission probability is set to 100%, if the channel busy level is greater than the maximum channel busy level then the retransmission probability is set to 0%, and within the minimum and maximum channel busy level retransmission thresholds the retransmission probability is set to decrease from 100% to 0% as a channel busy level of the communication channel rises from the minimum channel busy level retransmission threshold to the maximum channel busy level retransmission threshold; and responsive to randomly determining whether to retransmit according to the retransmission probability indicating to retransmit, retransmitting the message over the communication channel and updating the count of transmissions of the message.

In one or more illustrative examples, a non-transitory computer-readable medium comprises instructions for opportunistic packet retransmission, the instructions including retransmission rules that, when executed by a processor of a network node having a network interface to a communication channel, cause the processor to compute a channel busy level for the communication channel as a percentage of time that the communication channel is busy, including time that the network transceiver of the network node has spent transmitting over the channel; verify that a count of transmissions of a message over the communication channel is within a maximum retransmission limit for the message; when verified, and responsive to determining that a retransmission mode is set, calculate a retransmission probability using minimum and maximum channel busy level retransmission thresholds, such that if the channel busy level is less than the minimum channel busy level retransmission threshold then the retransmission probability is set to 100%, if the channel busy level is greater than the maximum channel busy level then the retransmission probability is set to 0%, and within the minimum and maximum channel busy level retransmission thresholds the retransmission probability is set to decrease from 100% to 0% as a channel busy level of the communication channel rises from the minimum channel busy level retransmission threshold to the maximum channel busy level retransmission threshold; and responsive to randomly determining whether to retransmit according to the retransmission probability indicating to retransmit, retransmit the message over the communication channel and updating the count of transmissions of the message

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
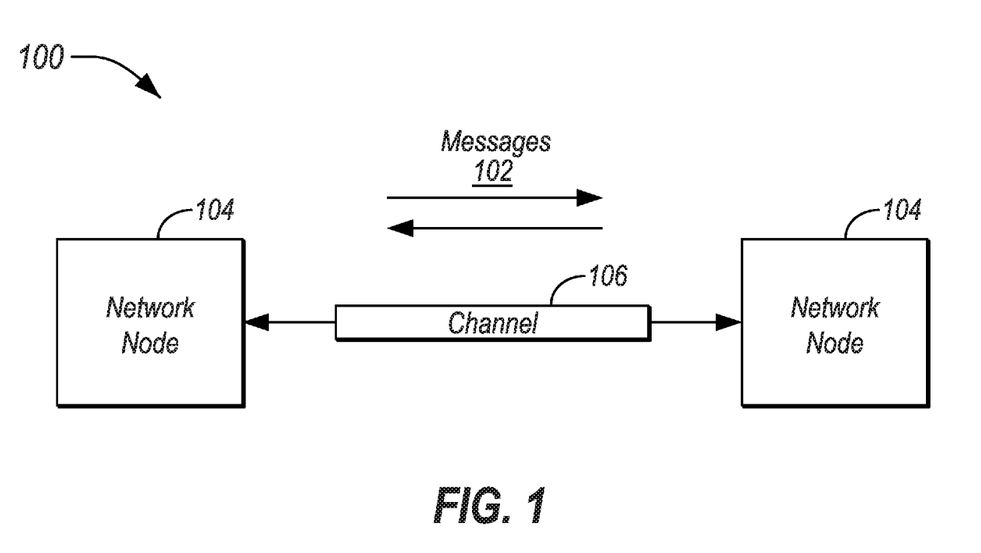
FIG. 1 illustrates an example of communication of messages between network nodes over a communication channel.

FIG. 1 illustrates an example 100 of communication of messages 102 between network nodes 104 over a communication channel 106. A message 102 includes data that is represented in a digital form and intended for transmission from one network node 104 to another network node 104. A message 102 may be formatted as a set of packets for transmission. Each packet may include a portion of data encapsulated by a packet header which contains information about the packet. This information may include a destination address of the network node 104 to which the message 102 is intended, a source address of the network node 104 providing the packet for transmission, and other information about the data being sent, such as length or a description.

Figure 2:
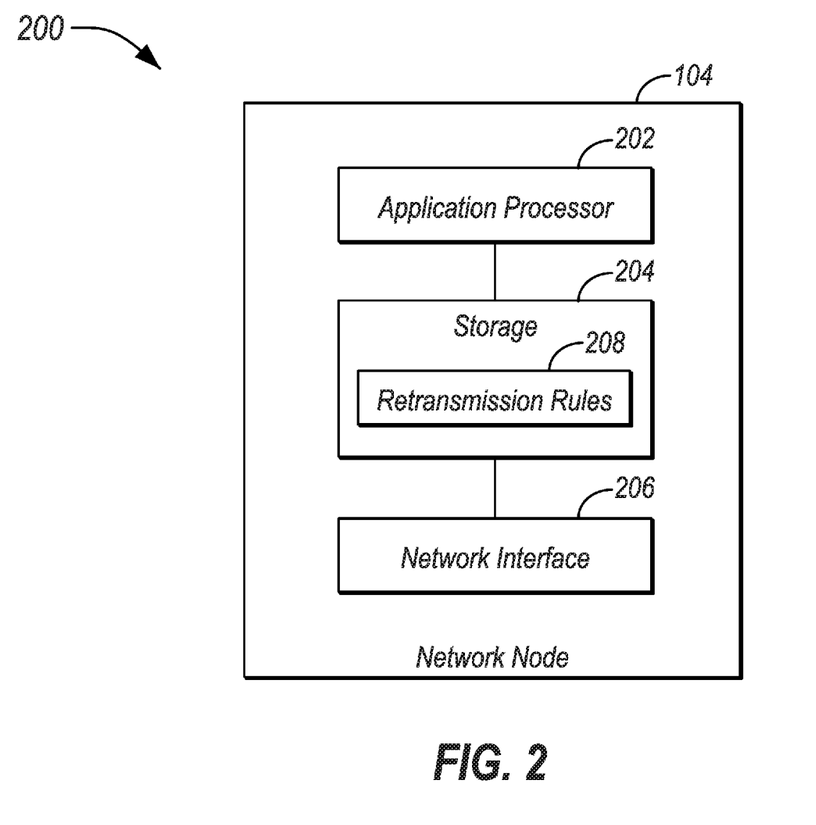
FIG. 2 illustrates an example detail of a network node.

FIG. 2 illustrates an example detail of a network node 104. The network nodes 104 are computing devices that may serve as sources and destinations for messages 102. As shown, the network node 104 includes an application processor 202, a storage 204, a network interface 206, and retransmission rules 208 installed to the storage 204.

The network nodes 104 may be any of various types of portable computing device, such as cellular phones, tablet computers, smart watches, laptop computers, portable music players, or other devices having processing and communications capabilities. The network nodes 104 may include one or more processors 202 configured to execute computer instructions, and a storage 204 on which the computer-executable instructions and/or data may be maintained. The network nodes 104 may further include a network interface 206 which may be used to connect the network nodes 104 to the communication channel 106.

Referring back to FIG. 1, the communication channel 106 is a path for the messages 102 to traverse between communicating network nodes 104. Examples of communication channels 106 may include twisted pair wire, coaxial cable, fiber optic cable, or wireless such as via Wi-Fi, cellular, microwave, or satellite transmissions. The communication channel 106 may include intermediate nodes that forward packets to the next node, and a link may refer to a discrete segment of the communication channel 106 such as a connection between two nodes.

The communication channel 106 may also be indicated as having a particular bandwidth, which refers to a bit rate that may be transmitted over the communication channel 106. The communication channel 106 may also have a level of busy-ness, which may be referred to herein as channel busy level (CBL). The CBL may be indicated as a percentage of the potential bandwidth of the channel 106 that is being used for the transmission of messages 102.

In data communications, whether wireless or cabled, the communication channel 106 inevitably introduces corruption and errors into the received packets, such that a recipient network node 104 may not correctly receive the original message 102 transmitted by the source network node 104. Retransmission of the original message 102 is a technique that may help improve communication reliability. However, retransmission also increases the congestion on the channel 106 and therefore also reduces the transmission opportunity for other sender network nodes 104.

An opportunistic approach for packet retransmission may be performed in which each sender network node 104 assesses a busy load of the channel 106 and then retransmits one or more times depending on whether the busy load of the channel 106 is sufficiently low. The approach may take into account various factors, including: (i) critical or sharp vehicle maneuver events, (ii) congestion control being inactive and (iii) availability of the channel 106. Regarding availability, a probabilistic rule may be used where the retransmission probability decreases as the channel 106 busy level becomes higher so as to have fairness for other senders. This probabilistic rule ensures that the fluctuation and variability in the channel 106 busy level can be managed to prevent senders from cycling between retransmitting and not retransmitting. This approach may be especially useful for vehicle-to-everything (V2X) applications (that may use hybrid-automatic repeat request (ARQ)) where reliability and fairness for all senders may be critical.

Retransmissions improve the reliability of a sender network node 104 communicating with a receiver network node 104. When the channel busy level is low (for example when relatively few users are occupying the channel 106 as compared to the capacity of the channel 106), retransmissions naturally help improve reliability and extend the range of communication for a sender. However, as the number of senders increases, the accumulative impact of their retransmissions amplify the congestion level of the channel and may cause downfall in the communication reliability due to higher chance of concurrent transmissions (i.e., packet errors).

The messages 102 may have different priority levels, and the amount of retransmit retries for a given messages 102 may depend on its priority. In an example, a critical event message 102 in V2X due to a hard braking event may necessitate the sender to send more retransmissions of the message 102 than when the sender is sending the same message 102 under default non-critical circumstances. Additionally, V2X communication may use a congestion control algorithm (such as the algorithm specified in "On-Board System Requirements for V2V Safety Communications," document J2945/1, published by the Society of Automotive Engineers (SAE)), where each sender decreases the frequency of its nominal transmissions as the number of similar senders is detected to increase. In such a situation, due to congestion and to avoid unfairness to others, it may be determined that no sender will retransmit its messages 102.

In general, retransmission (e.g., hybrid-ARQ in the cellular V2X context) may be made on a packet-by-packet (or BSM-by-BSM) basis. The BSM messages, as defined in SAE J2735 "Dedicated Short Range Communications (DSRC) Message Set Dictionary," may be used for indicating the position of the vehicle. Reliably in communicating such information may accordingly be important for traffic participants. When determining whether to retransmit data, it may be relevant whether the data is related to driving or vehicle operation, or whether the data is related to entertainment or other aspects that are not related to driving or vehicle operation. In an example, it may be desirable to prefer retransmission of BSM or other driving-related data when a vehicle makes a sharp maneuver, where retransmission would be a less relevant factor during a sharp maneuver for other transmissions such as the streaming of entertainment media files. The retransmission policy may thus be driven by various factors. A first factor may be that the number of allowed retransmissions is based on priority. In one example implementation, (i) a critical event may have four maximum retransmissions, (ii) an alternative high priority message for sharp vehicle maneuvers (such as hard braking or hard acceleration (e.g., due to high tracking error) that is not a critical event may have a maximum of three retransmissions, and (iii) a default number of retransmissions for any other message 102 may be limited to two retransmissions. These allowed maximum values are merely examples, and variations are possible. Moreover, these values may be set by the system operator as desired.

A second factor for the retransmission policy may be the critical nature or priority of the message 102. To explain, regardless of whether congestion control is active or inactive and also regardless of channel 106 busy level, the maximum number of allowed retransmissions are always made for a message 102 for a critical or high-priority event. These minimum number of retransmissions may aid in the probability of receipt of such messages 102 over that of other messages 102 over the channel 106.

A third factor for the retransmission policy may be the operation of congestion control. To explain, retransmissions may not be made when congestion control is active, since the channel 106 may already be experiencing too many transmissions (which caused congestion control to activate). Specifically, if the transmissions frequency of a sender network node 104 is set at higher than the default value of an InterTransmitTime variable (e.g., more than 100 milliseconds in V2X situations), no retransmission is allowed. An exception in the congestion control active state may be when the message 102 is critical or high priority, which then override the other factors and dictates the number of retransmissions.

A fourth factor to consider in the retransmission policy may be the channel busy level in default situations. For instance, the probability of retransmissions decreases as the channel 106 occupancy increases while congestion control is inactive (e.g., when vInterTransmitTime=100 milliseconds).

Figure 3:
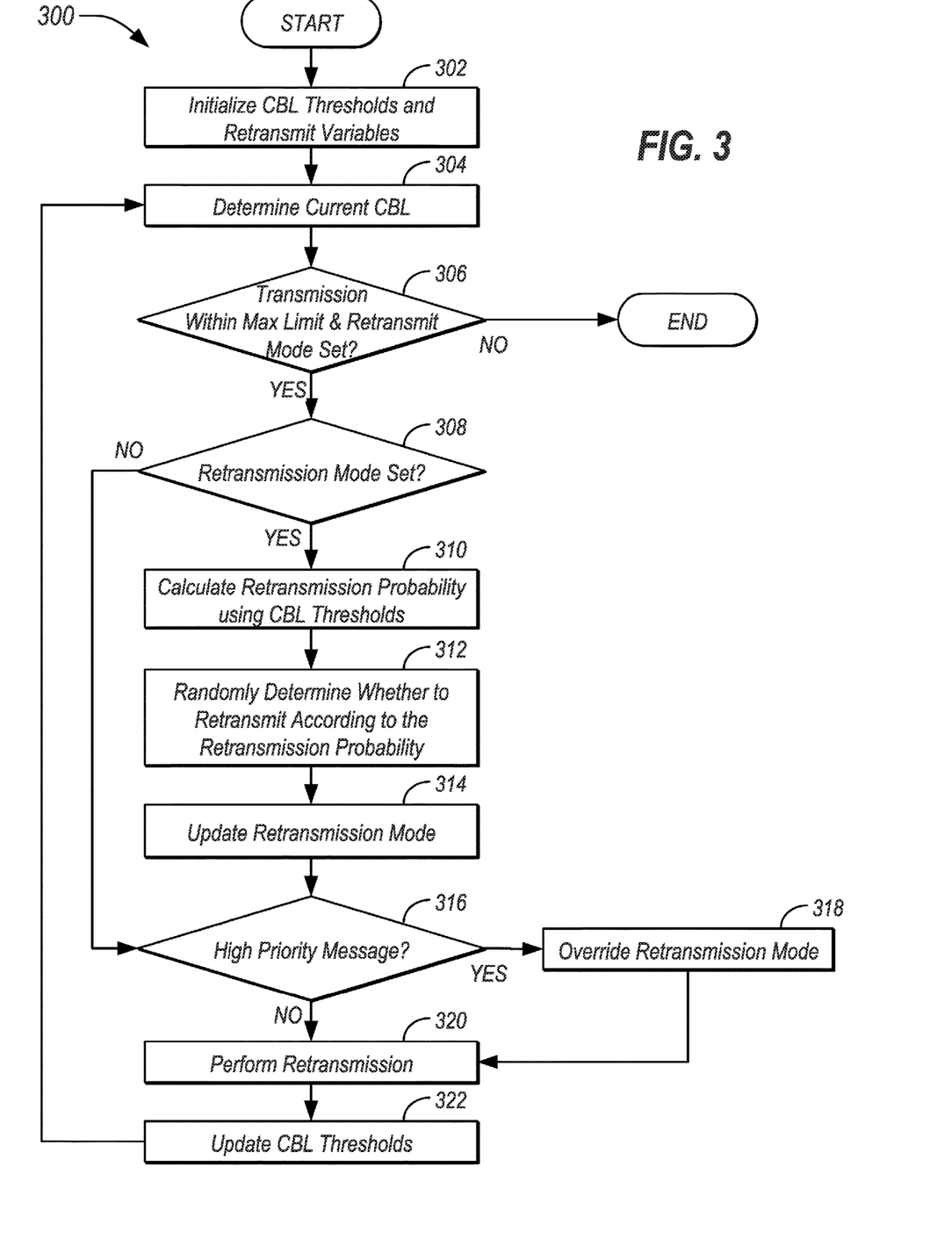
FIG. 3 illustrates an example process for the implementation of an opportunistic packet retransmission policy.

FIG. 3 illustrates an example process 300 for the implementation of an opportunistic packet retransmission policy. In an example, the opportunistic packet retransmission policy may be implemented by the retransmission rules 208 installed to the storage 204 of the network node 104 and executed by the processor 202 of the network node 104.

At operation 302, the process 300 may begin with initialization of CBL thresholds and retransmission variables. For instance, the maximum number of retransmissions may be reset to a predefined maximum, a retransmission mode variable may be initialized to retransmission mode being set, a current retransmission may be set to the first retransmission, the actual number of transmissions may be set to one, and the minimum CBL and maximum CBL thresholds may be set to desired values. Further aspects of the settings of the minimum CBL and maximum CBL thresholds are discussed in further detail below.

Retransmissions in the default case represent when there is no critical or high priority event in V2X traffic applications and congestion control is inactive. In this default case, the first data packet (original message) is always sent with 100% probability; a retransmission, however, is sent opportunistically based on how busy the channel 106 appears.

This channel occupancy is determined in terms of CBL. Thus, at operation 304, the current CBL is determined. In an example, the CBL may be measured by a sender network node 104 that continuously monitors the channel 106 over a predefined duration of time (this duration of time may be retrieved from a variable). For example, a CBL of 50% indicates that the channel is occupied by users 50% of the time. In the context of V2X, without loss of generality, CBL denotes both channel busy ratio (CBR) (as described in 3GPP C-V2X) or channel busy percentage (CBP) (as described in IEEE 802.11p or DSRC). The CBL also includes the percentage of time that the sender has spent on its own transmissions. The self-counting for CBL is already included in V2X standards such as SAE J2945/1. The duration of time variable denotes the interval in milliseconds that a sender monitors the channel. In V2X settings, nominally this variable may be set to 100 milliseconds, as BSMs may be broadcast at least every 100 milliseconds.

At operation 306, it is determined whether the current retransmission is less than or equal to the maximum allowable number of retransmissions plus one, and also that the retransmission mode is set to allow for retransmission. If so, control passes to operation 308. Otherwise, further retransmission will not be attempted and the process 300 ends.

Next, at 308, if the retransmission mode is set, control passes to operation 310 to calculate the retransmission probability. If the retransmission mode is not set, control passes to operation 316, which is discussed in detail below.

With respect to operation 310, the retransmission probability is computed according to the CBL minimum and maximum thresholds. In an example, if the current load on the channel (e.g., the CBL) is below a minimum threshold (e.g., CBL<vCBLmin), retransmissions are always made. Moreover, if the current CBL is higher than the maximum threshold (e.g., CBL>vCBLmax), no retransmission is made. However, if the CBL is between these two thresholds, a retransmission is made with a certain probability. In one implementation, this probability decreases from 100% to zero as the CBL rises from vCBLmin to vCBLmax as a linear function. For example, if the CBL equals (vCBMmin+vCBLmax)/2, the retransmission probability is 50% (meaning there is a half and half chance that the original packet's retransmitted version is sent). However, it should be noted that use of a linear function is only one possibility, and that other functions having a monotonic decrease in retransmission probability with the rise in channel busy-ness may be used, such as exponential, quadratic, or other functions.

At operation 312, it is determined whether or not to retransmit, according to random change using the retransmission probability determined at operation 310. This may include, for example, generating a random value, and determining whether or not the random value indicates that retransmission should take place scaled according to the retransmission probability.

The determination results of operation 312 are utilized at operation 314 to update the retransmission mode to allow retransmission if the probability is met, and to update the retransmission mode to disallow retransmission if random value probability is not met.

At operation 316, the retransmission probability is updated to account for message priority. In some implementations, if the message to be retransmitted refers to a critical event or a high-priority event (but not a default level event), then control passes to operation 318 to set the retransmission mode to allow for retransmission, after which control passes to operation 320. If the message is not deemed critical or high-priority at operation 316, then control passes to operation 320. Criticality or high-priority of the message may be determined from fields in the message itself, and/or from content of the message transmission, such as due to presence of a hard-braking event or other criteria as discussed above. It should be noted that these are just examples, and various other approaches to providing additional retransmission effort for higher priority messages may be used.

Next, at operation 320 the retransmission is performed. Responsive to retransmission, the count of retransmissions is increased. Additionally, at operation 322, the minimum CBL and maximum CBL thresholds may be updated, as discussed in detail below. After operation 322, control returns to operation 304 to calculate an updated CBL. In other examples, it should be noted that CBL may be recalculated asynchronously from the flow of the process 300, and operation 304 may not be present in the process 300. In such an example, control may pass from operation 302 to operation 306, and from operation 322 to operation 306.

It should be noted that when using the process 300, even with a default priority message, the sender may send more than just one retransmission. A subsequent retransmission (e.g., second or third retransmission) may be made (i) if the prior retransmission has already been made or (ii) if the maximum number of retransmissions permitted by the implementer is not reached. In each subsequent retransmission, however, the thresholds set for vCBLmin and vCBLmax are decreased to ensure that the overall system always remains stable. Stability in the occupancy of the channel is an important requirement for a communication network. If the senders were to naively retransmit and switch off their retransmissions if the CBL was large, then their communication performance may become unpredictable and the overall network data rate may be degraded.

Table 1 illustrates an example implementation of the process 300, coded for MATLAB:

TABLE 1

Example MATLAB Implementation of
Opportunistic Packet Retransmissions

Maximum number of retransmissions = Nmax
RetransmissionMode = 1;
CurrentRetransmission = 1;
actualNumtransmissions = 1;
set vCBLmin and vCBLmax to desired values
(see Proposed Thresholds section below)
while CurrentRetransmission <= Nmax+1 && RetransmissionMode == 1
  if RetransmissionMode == 1
    if CBL <= vCBLmin
      Prob_retransmit = 100;
    elseif CBL >= vCBLmax
      Prob_retransmit = 0;
    else
      Prob_retransmit = 100* (vCBLmax − CBL )/ (vCBLmax − vCBLmin);
    end
    % (uniform random number between 0-1)
    retransmit = rand( ) <Prob_retransmit/100;
    if retransmit==0
      RetransmissionMode =0;
    end
  end
  if Exceptional_event == 1 %Critical event or high priority event
    RetransmissionMode =1;
  end
% Make retransmission and add to counter
  CurrentRetransmission = CurrentRetransmission + 1;
  update vCBLmin;
  update vCBLmax;
end The choice of vCBLmin and vCBLmax are dictated by a need to balance stability with opportunistically using the channel 106 (e.g., a sender performs retransmissions for reliability but without causing unfairness for other senders). Moreover, the value of vCBLmin must be less than half of vCBLmax to reduce the chance of instability, since doing so may ensure that senders do not switch from retransmitting (high CBL) to not retransmitting (low CBL) in an endless cycle. The process 300, accordingly, presumes that the retransmitted data packets are almost the same size as the original packet.

Figure 4:
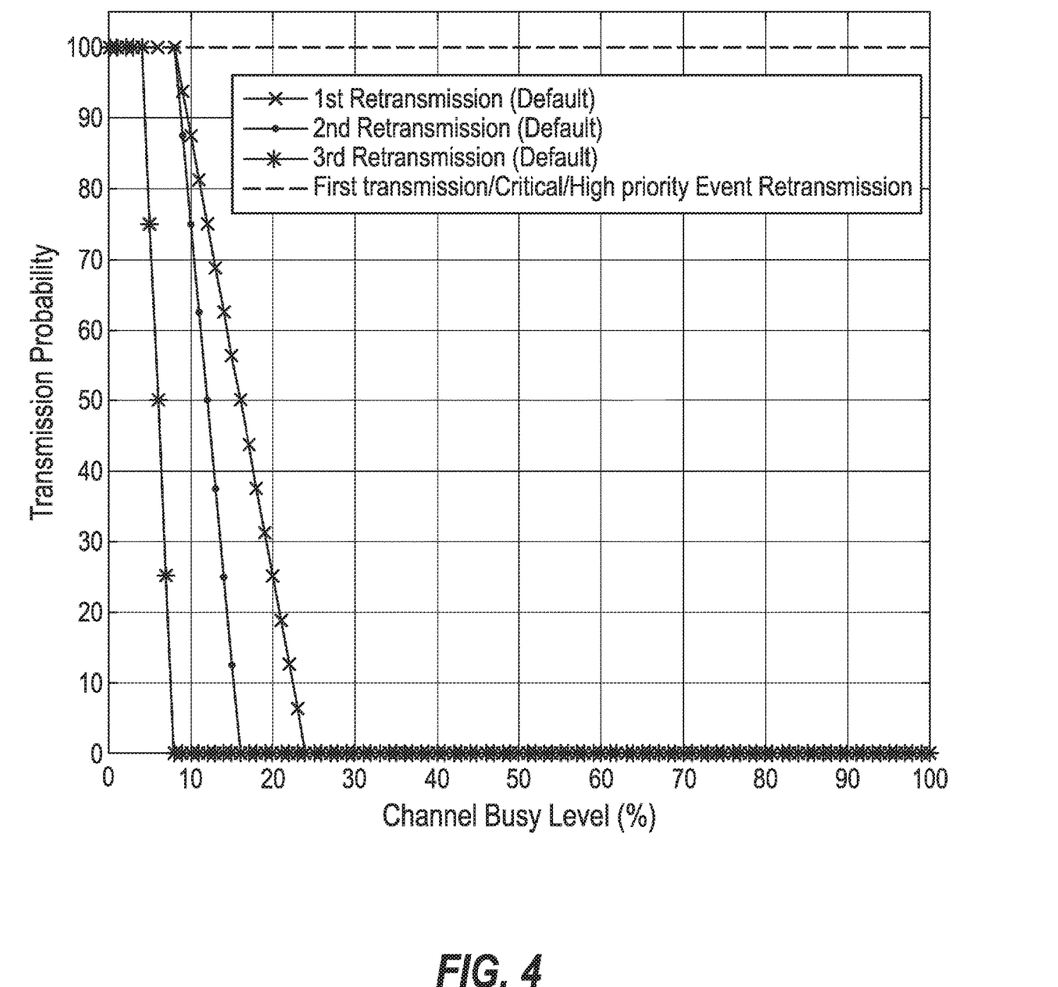
FIG. 4 illustrates an example graph of transmission probability according to channel busy level.

FIG. 4 illustrates an example graph 400 of transmission probability according to channel busy level (CBL). The example graph 400 shows the retransmission policy for a sender that can make three retransmissions. The first line denotes the likelihood of transmission of first packet and retransmission in critical/high tracking error situations. The first retransmission is made based on the second probability function. The second retransmission is made if the first retransmission has been made with probability denoted by the third line. The third retransmission is made if the second retransmission was made with the probability denoted by the black line.

With respect to recommended thresholds, a 50% retransmission probability of the first retransmission creates maximum uncertainty or fluctuation in the CBL by the sender. The CBL at this level is referred to as CBL_maximum_uncertainty. In example graph 400, the vCBLmax is set to 24% and the vCBLmin is set to 8%. The mid-point CBL is therefore (24+8)/2=16% at 50% retransmission probability. Note that vCBLmin is at least half of vCBLmax, to prevent cycling between retransmitting and not retransmitting.

The second retransmission probability is set to zero at CBLs of 16% or higher depending on whether the first retransmission was made. The variable vCBLmax on the second retransmission is 16% (e.g., which at the mid-point of the vCBLmax and vCBLmin of the first retransmission), where vCBLmin is 8% (which is half of that). The third retransmission is then conditioned on whether the second retransmission is made and with vCBLmax set to 8% (e.g., half of the vCBLmax of 16%) and vCBLmin set to 4% (e.g., half of the vCBLmin of 8%).

More generally, for a first retransmission vCBLmax and vCBLmin are set according to Equations 1:

$$(\text{vCBLmax} + \text{vCBLmin})/2 = \text{CBL at 50\% retransmission probability} \quad (1)$$
$$(\text{CBL\_maximum\_uncertainty}); \text{ and}$$
$$\text{vCBLmin} < \text{vCBLmax}.$$

For second or further retransmissions, vCBLmax and vCBLmin are set according to Equations 2:

$$\text{vCBLmax} < \text{CBL\_maximum\_uncertainty} \quad (2)$$
$$\text{vCBLmin} < \text{vCBLmax}/2$$
$$\text{CBL\_maximum\_uncertainty} = (\text{vCBLmax} + \text{vCBLmin})/2$$

The above operations may be repeated until the number of retransmissions reaches the maximum allowed Nmax.

Figure 5:
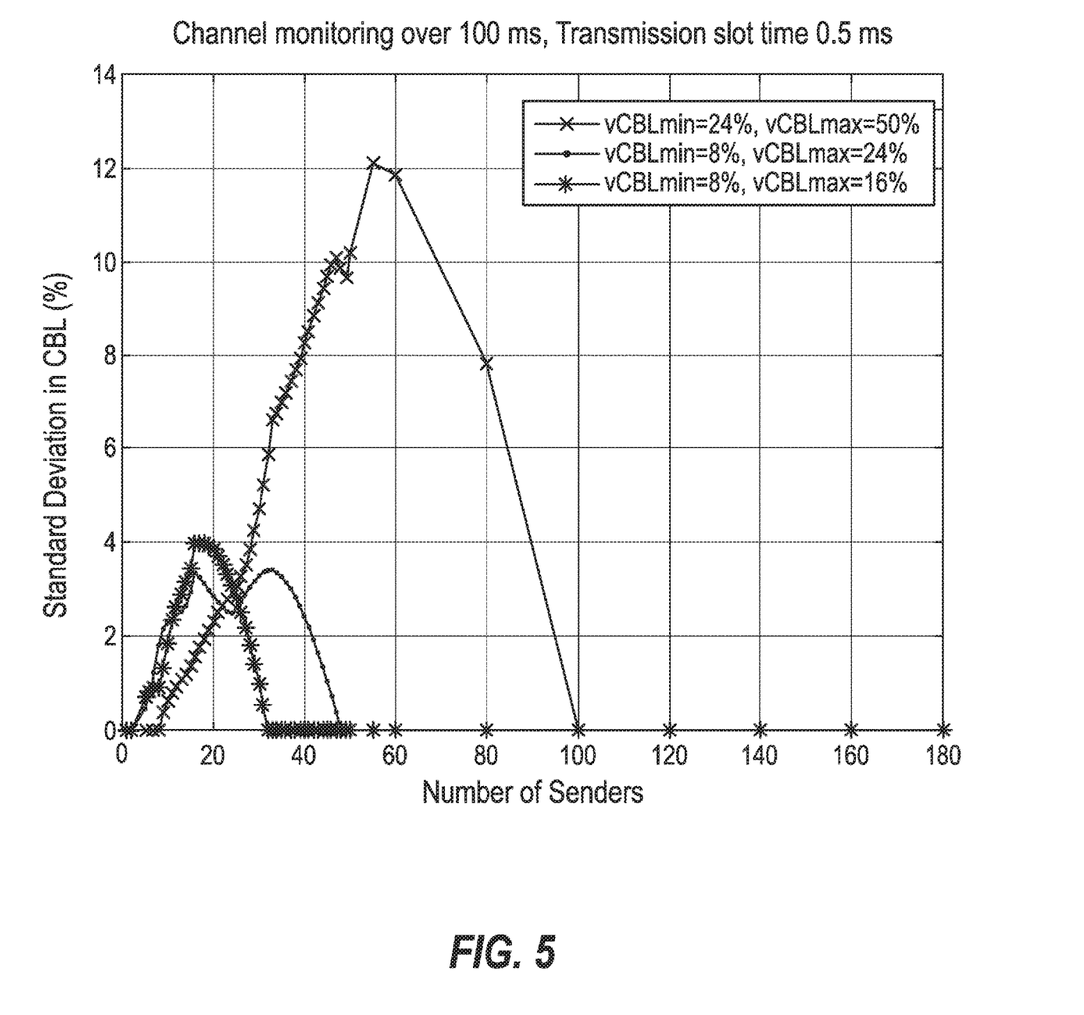
FIG. 5 illustrates an example graph of a simulation illustrating control of fluctuations in the channel busy level.

FIG. 5 illustrates an example graph 500 of a simulation illustrating control of fluctuations in the channel busy level. In the example graph 500, computer simulations for a Cellular V2X (C-V2X) setup are used to illustrate that fluctuations in CBL can be controlled. The simulation is set with (i) 100 milliseconds channel busy monitoring time, (ii) Nmax=3, and (iii) 0.5 milliseconds per transmission with over 3000 random trials each with 20 iterations per trial. The setup is therefore designed to simulate a C-V2X scenario in which each sender is assigned unique and non-overlapping slot as other senders. Thus, all transmissions and retransmissions of each sender do not concurrently transmit with other users. The appropriate choice of vCBLmin and vCBLmax can be determined to optimize the CBL fluctuations with more retransmissions. In the example graph 500, the fluctuations are illustrated in terms of standard deviation of the CBL for a few thresholds of vCBLmin and vCBLmax under the default policy. No critical or high tracking error events were assumed.

In sum, the aforementioned approach to opportunistic packet retransmission works with various types of retransmission techniques (e.g., wireline, wireless, ARQ, HARQ etc.). The approach balances a need for better communication reliability with the additional congestion created by retransmissions, especially in V2X environments. When congestion levels are low, the senders can opportunistically retransmit to improve lower Packet Error Rate (PER) performance. When the congestion level is high, the likelihood of retransmission is reduced to alleviate congestion (e.g., for fairness to other senders). The approach also balances congestion control, critical/high priority events, and channel utilization in a stable manner as the number of V2X senders increases. For instance, when determining whether to retransmit data, BDM or other data transmitted in the context of critical/high priority events related to the driving task may be higher priority for retransmission above other data that is unrelated to driving or vehicle operation. The approach does not require the receiver to know whether a retransmission was made or not. The approach also does not require any cooperation or coordination between the senders, instead the approach only requires senders to know the current level of channel congestion. The approach does not require senders to store a history or have a memory of previous packet transmissions. The approach is fair for all senders, as it does not grant privilege or prioritize one sender over others. Finally, the approach provides all senders a chance to send some packets with retransmissions.

Computing devices described herein, such as the network nodes 104, generally include computer-executable instructions where the instructions may be executable by one or more computing devices such as those listed above. Computer-executable instructions, such as those of the retransmission rules 208, may be compiled or interpreted from computer programs created using a variety of programming languages and/or technologies, including, without limitation, and either alone or in combination, JAVA, C, C++, C#, VISUAL BASIC, JAVASCRIPT, PYTHON, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for opportunistic packet retransmission, comprising:
 a network node, including a processor and a network transceiver configured to perform network communication over a communication channel, the processor programmed to transmit a message over the communication channel,
 verify that a count of transmissions of the message is within a maximum retransmission limit for the message,
 determine a channel busy level for the communication channel,
 responsive to determining that a retransmission mode is set, calculate a retransmission probability using minimum and maximum channel busy level retransmission thresholds, such that if the channel busy level is less than the minimum channel busy level retransmission threshold then the retransmission probability is set to 100%, if the channel busy level is greater than the maximum channel busy level then the retransmission probability is set to 0%, and within the minimum and maximum channel busy level retransmission thresholds the retransmission probability is set to decrease from 100% to 0% as the channel busy level rises from the minimum channel busy level retransmission threshold to the maximum channel busy level retransmission threshold,
 update the retransmission mode by randomly determining whether to retransmit according to the retransmission probability, and
 if the retransmission mode indicates to continue with retransmission, perform retransmission of the message over the communication channel and update the count of transmissions of the message.

2. The system of claim 1, wherein the processor is further programmed to:

determine a priority of the message; and responsive to determining that the priority of the message is high priority, override the retransmission mode to provide for retransmission of the message.

3. The system of claim 2, wherein the processor is further programmed to determine the message as being high priority responsive to occurrence of a sharp vehicle maneuver event by a vehicle including the network node.

4. The system of claim 1, wherein the processor is further programmed to set the maximum retransmission limit for the message according to a priority of the message.

5. The system of claim 1, wherein the processor is further programmed to, for a first retransmission of the message, set the minimum and maximum channel busy level retransmission thresholds such that an arithmetic average of the minimum and maximum channel busy level retransmission thresholds is a channel busy level providing for 50% probability of retransmission of the message, and the minimum channel busy level retransmission threshold is less than the maximum channel busy level retransmission threshold.

6. The system of claim 1, wherein the processor is further programmed to, for a second or greater retransmission of the message, set the minimum and maximum channel busy level retransmission thresholds such that the maximum channel busy level retransmission threshold is less than the channel busy level providing for a 50% probability of retransmission of the message and the minimum channel busy level retransmission threshold is less than half of the maximum channel busy level retransmission threshold.

7. The system of claim 6, wherein the processor is further programmed to determine the channel busy level providing for a 50% probability of retransmission of the message as an average of the minimum and maximum channel busy level retransmission thresholds in view of the channel busy level.

8. The system of claim 1, wherein the processor is further programmed to compute the channel busy level as a percentage of time that the channel is busy, including time that the network transceiver of the network node has spent transmitting over the channel.

9. A method for opportunistic packet retransmissions by a network node, comprising:

verifying that a count of transmissions of a message over a communication channel is within a maximum retransmission limit for the message;

when verified, and responsive to determining that a retransmission mode is set, calculating a retransmission probability using minimum and maximum channel busy level retransmission thresholds, such that if the channel busy level is less than the minimum channel busy level retransmission threshold then the retransmission probability is set to 100%, if the channel busy level is greater than the maximum channel busy level then the retransmission probability is set to 0%, and within the minimum and maximum channel busy level retransmission thresholds the retransmission probability is set to decrease from 100% to 0% as a channel busy level of the communication channel rises from the minimum channel busy level retransmission threshold to the maximum channel busy level retransmission threshold; and responsive to randomly determining whether to retransmit according to the retransmission probability indicating to retransmit, retransmitting the message over the communication channel and updating the count of transmissions of the message.

10. The method of claim 9, further comprising overriding the determination whether to retransmit responsive to determining the message as being high priority.

11. The method of claim 9, further comprising setting the maximum retransmission limit for the message according to a priority of the message.

12. The method of claim 9, further comprising, for a first retransmission of the message, setting the minimum and maximum channel busy level retransmission thresholds such that an arithmetic average of the minimum and maximum channel busy level retransmission thresholds is a channel busy level providing for 50% probability of retransmission of the message, and the minimum channel busy level retransmission threshold is less than the maximum channel busy level retransmission threshold.

13. The method of claim 9, further comprising, for a second or greater retransmission of the message, setting the minimum and maximum channel busy level retransmission thresholds such that the maximum channel busy level retransmission threshold is less than the channel busy level providing for a 50% probability of retransmission of the message and the minimum channel busy level retransmission threshold is less than half of the maximum channel busy level retransmission threshold.

14. The method of claim 13, further comprising determining the channel busy level providing for a 50% probability of retransmission of the message as an average of the minimum and maximum channel busy level retransmission thresholds in view of the channel busy level.

15. The method of claim 9, further comprising computing the channel busy level as a percentage of time that the channel is busy, including time that the network node has spent transmitting over the channel.

16. A non-transitory computer-readable medium comprises instructions for opportunistic packet retransmission, the instructions including retransmission rules that, when executed by a processor of a network node having a network interface to a communication channel, cause the processor to:

compute a channel busy level for the communication channel as a percentage of time that the communication channel is busy, including time that the network transceiver of the network node has spent transmitting over the channel;

verify that a count of transmissions of a message over the communication channel is within a maximum retransmission limit for the message;

when verified, and responsive to determining that a retransmission mode is set, calculate a retransmission probability using minimum and maximum channel busy level retransmission thresholds, such that if the channel busy level is less than the minimum channel busy level retransmission threshold then the retransmission probability is set to 100%, if the channel busy level is greater than the maximum channel busy level then the retransmission probability is set to 0%, and within the minimum and maximum channel busy level retransmission thresholds the retransmission probability is set to decrease from 100% to 0% as a channel busy level of the communication channel rises from the minimum channel busy level retransmission threshold to the maximum channel busy level retransmission threshold; and responsive to randomly determining whether to retransmit according to the retransmission probability indicating to retransmit, retransmit the message over the communication channel and updating the count of transmissions of the message.

17. The medium of claim 16, further comprising instructions that, when executed by the processor, cause the processor to:
   determine a priority of the message responsive to occurrence of a sharp vehicle maneuver event by a vehicle including the network node;
   set the maximum retransmission limit for the message according to a priority of the message; and
   responsive to determining that the priority of the message is high priority, override the retransmission mode to provide for retransmission of the message.

18. The medium of claim 16, further comprising instructions that, when executed by the processor, cause the processor to, for a first retransmission of the message, set the minimum and maximum channel busy level retransmission thresholds such that an arithmetic average of the minimum and maximum channel busy level retransmission thresholds is a channel busy level providing for 50% probability of retransmission of the message, and the minimum channel busy level retransmission threshold is less than the maximum channel busy level retransmission threshold.

19. The medium of claim 16, further comprising instructions that, when executed by the processor, cause the processor to, for a second or greater retransmission of the message, set the minimum and maximum channel busy level retransmission thresholds such that the maximum channel busy level retransmission threshold is less than the channel busy level providing for a 50% probability of retransmission of the message and the minimum channel busy level retransmission threshold is less than half of the maximum channel busy level retransmission threshold.

20. The medium of claim 16, further comprising instructions that, when executed by the processor, cause the processor to determine the channel busy level providing for a 50% probability of retransmission of the message as an average of the minimum and maximum channel busy level retransmission thresholds in view of the channel busy level.

* * * * *